UNITED STATES PATENT OFFICE.

ALFRED W. PRATT, OF FLUSHING, NEW YORK, ASSIGNOR OF ONE-HALF TO HENRY S. LAMBERT, OF ORANGE, NEW JERSEY.

COMPOSITION FOR DRYING PAINTS AND OILS.

SPECIFICATION forming part of Reissued Letters Patent No. 10,039, dated February 21, 1882

Original No. 211,928, dated February 4, 1879. Application for reissue filed November 10, 1880.

*To all whom it may concern:*

Be it known that I, ALFRED W. PRATT, of Flushing, in the county of Queens, in the State of New York, have invented a certain new and useful Process for the Production of a Composition to be Used as a Drier for Paints, Oils, &c., which is fully set forth in the following specification.

My invention consists of a process for the production of manganese-lead soap to be used as a drier for oils, paints, &c., as follows: I take caustic soda, dissolve the same in water in such proportions as to make a strong lye. I then put this lye into a receptacle with as much oil as it will saponify and boil them until the mixture becomes plastic. Then I mix a solution of chloride of manganese or other manganese salts with an aqueous solution of some salt or salts of lead—such as acetate—and this solution I add to the plastic mass produced by the saponification of the oil by the lye. The plastic mixture acts on the liquid mixture, thereby producing a manganese-lead soap. I then cleanse this resultant plastic mass (manganese-lead soap) with water and dry it, and when so dried I add rosin or other resinous substances, and then heat the mixture in any suitable receptacle until it becomes a homogeneous mass, then remove the composition from the receptacle and allow it to cool.

I obtain the best result by taking ten pounds of caustic soda, seven and a half gallons of oil, (linseed preferred,) thirty-four pounds of rosin or other resinous substances, fourteen pounds of some salt of lead or salts of lead, and ten gallons of a solution of chloride of manganese. I do not, however, confine myself to these exact proportions of the ingredients, as they may be varied considerably.

I prefer to use as an ingredient in this composition the nitrate of lead or the brown or white sugar of lead; but any other salt of lead may be substituted therefor.

Other alkalies may be used instead of caustic soda, and instead of chloride of manganese any salt of manganese may be substituted, and the salts of manganese can be used without dissolving them in water.

A drier will be produced without the addition of rosin or other resinous substances, although a better article is produced with using it. I prefer to use the chloride of manganese left as a residuum after heating black oxide of manganese in contact with muriatic acid, as in the ordinary process of manufacturing free chlorine. This manganese-lead soap may be used just as it is, or thinned or diluted by adding thirty-five gallons of oil, (for which turpentine and naphtha may be partly or wholly substituted,) when the composition is ready for use as a liquid drier for facilitating the drying of paints and oils.

What I claim is—

1. The within-described process of producing a manganese-lead soap by treating oil with caustic alkali, or its equivalent, and the resulting plastic mass with a mixture of manganese and lead salts, as described.

2. The within-described process of producing a manganese-lead soap by treating oil with caustic alkali or its equivalent, and the resulting plastic mass with a liquid mixture of manganese chloride and lead salts, and adding thereto rosin or other resinous substances.

ALFRED W. PRATT.

Witnesses:

JOHN BIGELOW,

JOHN R. BENNETT.